United States Patent
Ozaki et al.

(10) Patent No.: US 7,874,732 B2
(45) Date of Patent: Jan. 25, 2011

(54) BEARING DEVICE FOR DRIVE WHEEL

(75) Inventors: Takayoshi Ozaki, Iwata (JP); Shigeaki Fukushima, Iwata (JP)

(73) Assignee: NTN Corporation, Osaka (JP)

( * ) Notice: Subject to any disclaimer, the term of this patent is extended or adjusted under 35 U.S.C. 154(b) by 363 days.

(21) Appl. No.: 12/223,387

(22) PCT Filed: Jan. 17, 2007

(86) PCT No.: PCT/JP2007/000015

§ 371 (c)(1),
(2), (4) Date: Jul. 30, 2008

(87) PCT Pub. No.: WO2007/088698

PCT Pub. Date: Aug. 9, 2007

(65) Prior Publication Data

US 2009/0169143 A1    Jul. 2, 2009

(30) Foreign Application Priority Data

Jan. 31, 2006  (JP) ............................ 2006-022177
Jan. 31, 2006  (JP) ............................ 2006-022178

(51) Int. Cl.
*F16C 32/00* (2006.01)
(52) U.S. Cl. ...................... 384/448; 384/544
(58) Field of Classification Search ............... 384/448, 384/544, 589
See application file for complete search history.

(56) References Cited

U.S. PATENT DOCUMENTS

| | | | |
|---|---|---|---|
| 6,471,407 B1 | 10/2002 | Katano | |
| 2002/0126929 A1 | 9/2002 | Ozawa et al. | |
| 2005/0259900 A1* | 11/2005 | Bianco et al. | ............... 384/448 |
| 2006/0070462 A1 | 4/2006 | Takizawa et al. | |
| 2006/0153482 A1* | 7/2006 | Koike et al. | ................. 384/448 |

(Continued)

FOREIGN PATENT DOCUMENTS

JP    2001-21577    1/2001

(Continued)

OTHER PUBLICATIONS

International Search Report mailed Apr. 3, 2007 in connection with International Application No. PCT/JP2007/000015.

(Continued)

*Primary Examiner*—Thomas R Hannon

(57) ABSTRACT

A drive wheel support bearing assembly includes a hub axle, a constant velocity joint and a bearing unit which are unitized together, and an inner member made up of an outer coupling member of the CVT with the hub axle mounted on an outer periphery of a hollow stem portion of the outer coupling member. Inner peripheral side raceway surfaces are formed on the hub axle and the outer coupling member. Hardened indentations are formed in an inner periphery of the hub axle, and the hub axle and the outer coupling member are plastically coupled integrally with each other by radially outwardly expanding a mounting area, at which the hub axle is mounted on the hollow stem portion, to allow it to bite into the indentations to crimp. Sensors for detecting the displacement or deformation of the outer coupling member and the hub axle are provided in the outer member.

12 Claims, 9 Drawing Sheets

U.S. PATENT DOCUMENTS

2006/0186627 A1    8/2006    Koyagi et al.
2007/0058892 A1*   3/2007    Motohashi et al. .......... 384/448

FOREIGN PATENT DOCUMENTS

| | | |
|---|---|---|
| JP | 2002-254901 | 9/2002 |
| JP | 2005-31063 | 2/2005 |
| JP | 2006-9866 | 1/2006 |
| JP | 2006-10478 | 1/2006 |
| WO | 2004/081581 A1 | 9/2004 |

OTHER PUBLICATIONS

International Preliminary Report on Patentability mailed on Aug. 14, 2008 and issued in corresponding International Patent Application No. PCT/JP2007/000015.

* cited by examiner

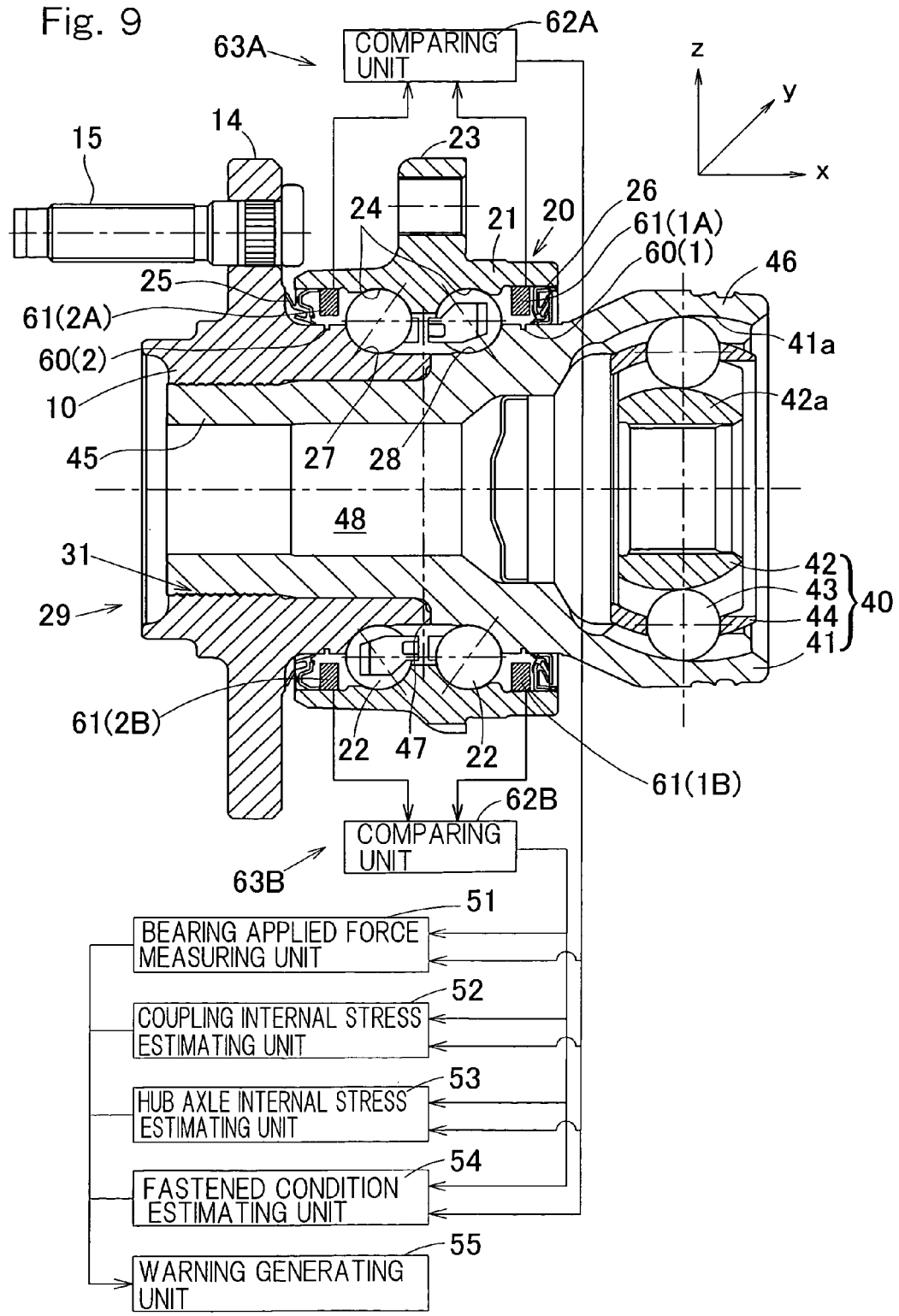

BEARING DEVICE FOR DRIVE WHEEL

CROSS REFERENCE TO RELATED PATENT APPLICATIONS

This application claims the benefit under 35 U.S.C. Section 371 of International Application No. PCT/JP2007/000015 filed Jan. 17, 2007, which claimed priority to Japanese Application No(s). 2006-022177 and 2006-022178 filed Jan. 31, 2006, in the Japanese Patent Office, the disclosures of which are hereby incorporated by reference.

BACKGROUND OF THE INVENTION

1. Field of the Invention

The present invention relates to a drive wheel support bearing assembly for rotatably supporting a vehicle wheel of a type used in, for example, an automotive vehicle and, more particularly, to a drive wheel support bearing assembly of a fourth generation type equipped with a sensor, in which a hub axle and a constant velocity universal joint are unitized together.

2. Description of the Prior Art

For safety travel of an automotive vehicle, the wheel support bearing assembly has hitherto been well known in the art, which is equipped with a sensor for detecting the rotational speed of one of automotive wheels. While the automobile traveling safety precaution is generally taken by detecting the rotational speed of a wheel of various parts, it is not sufficient with only the rotational speed of the wheel and, therefore, it is desired to achieve a more stable and more precise vehicle attitude control for safety purpose with the use of other sensor signals.

In view of this, it may be contemplated to achieve the vehicle attitude control based on a load acting on each of the wheels during travel of an automotive vehicle. By way of example, a large load acts on the outside wheels during the cornering, on the wheels on one side during the run along left and right inclined road surfaces or on the front wheels during the braking, and, thus, a varying load acts on the vehicle wheels. Also, even in the case of the uneven live load, the loads acting on those wheels tend to become uneven. For this reason, if the loads acting on the wheels can be detected as needed, suspension systems for the vehicle wheels can be controlled beforehand based on results of detection of the loads so that the attitude of the automotive vehicle during the traveling thereof (for example, prevention of a rolling motion during the cornering, prevention of diving of the front wheels during the braking, and prevention of diving of the vehicle wheels brought about by an uneven distribution of live loads) can be accomplished. However, no space for installation of the load sensor for detecting the load acting on the respective vehicle wheel is available and, therefore, the attitude control through the detection of the load can hardly be realized.

Also, in the event in the near future the steer-by-wire is introduced and the system, in which the wheel axle and the steering come not to be coupled mechanically with each other, is increasingly used, information on the road surface comes to be required to transmit to the steering wheel hold by a driver by detecting a wheel axis direction load.

In order to meet those needs hitherto recognized, the provision of a sensor for detecting the load acting on the wheel support bearing assembly has been suggested. (See, for example, the Patent Document 1 quoted below.)

In the wheel support bearing assembly for a vehicle drive wheel, a fourth generation type structure, in which a hub axle 10, a constant velocity universal joint 40 and a bearing unit 20 are unitized, is often employed as shown in FIG. 16. Except for a sensor for detecting the rotational speed of the vehicle wheel that is directly installed in the drive wheel support bearing assembly including the fourth generation type, various sensors including, for example, an acceleration sensor, which are used to secure information useful in the vehicle attitude control, are generally mounted on an upper side of suspension springs that are disposed between the vehicle body structure and the drive wheel support bearing assembly, or on the side of a vehicle body structure on the suspension springs.

Also, a version of the wheel support bearing assembly of the fourth generation type discussed above, has also been suggested, in which a stem portion 45 of an outer coupling member 41 of the constant velocity universal joint 40 has an axially extending center bore defined therein and is, while the stem portion 45 is neatly inserted into an axially extending center bore of the hub axle 10, expanded radially outwardly by use of a crimping tool to fasten the hub axle 10 and the outer coupling member 41 together (See Patent Document 2 quoted below). While some crimping techniques are available for fastening the outer coupling member 41 and the hub axle 10 together, the diametrical expansion and crimping technique referred to above has some advantages in that loosening does little occur in the crimped area and, accordingly, a preload release resulting from a change in dimension between double row raceway surfaces can be prevented and the preload can therefore be maintained in the bearing assembly.

[Patent Document 1] Japanese Laid-open Patent Publication No. 2006-9866

[Patent Document 2] Japanese Laid-open Patent Publication No. 2002-254901

As discussed above, in the drive wheel support bearing assembly, in which the hub axle, the constant velocity universal joint and the bearing unit are unitized, the various sensors for use in the vehicle attitude control are mounted on the side of the vehicle body structure above springs or so-called on a sprung mass side. For this reason, a time lag tends to occur in receiving the information and as a result, an increase of the response of a control system to, for example, a change in status of the road surface has been limited. Also, detailed information on the drive wheel support bearing assembly including, for example, a change in dimension between the double row raceway surfaces, which is associated with the preload and rigidity of the bearing unit, cannot be detected, failing to achieve an accurate vehicle attitude control.

Also, in the case of the above described diametrical expansion and crimping technique, in which the stem portion 45 is radially outwardly expanded so that the hub axle 10 and the constant velocity universal joint 40 can be fastened together, the loosening occurs hardly in the crimped area, and further, displacement in position between the hub axle 10 and the outer coupling member 41 of the constant velocity universal joint 40 occurs hardly. However, even with the diametrical expansion and crimping technique, when an excessive external input such as, for example, ride over a curb is applied, loosening may occur in the crimped area, accompanied by a change in dimension between the double row raceway surfaces, and this may lead to release of the preload. The preload release then leads to earlier peeling of the bearing and reduction in rigidity and, therefore, it is desirable to monitor at all times, the condition in which they are fastened together.

SUMMARY OF THE INVENTION

An object of the present invention is to increase the response of the vehicle attitude control technique relative to a change in status of the road surface by providing a drive wheel support bearing assembly of a type, in which the hub axle, the constant velocity universal joint and a bearing unit are unitized, with sensors for the vehicle attitude control at proper positions.

Another object of the present invention is to enable the vehicle attitude control to be accomplished accurately and safely at all times by the addition of a function of diagnosing the presence or absence of an abnormality in the bearing assembly.

A further object of the present invention is to prevent the earlier peeling or the like of the bearing unit, which would result from the preload release, by way of monitoring a crimped condition of the diametrically expanded and crimped portion.

A drive wheel support bearing assembly of the present invention includes a hub axle, a constant velocity universal joint and a bearing unit which are unitized together; an inner member including an outer coupling member of the constant velocity universal joint and the hub axle mounted on an outer periphery of a hollow stem portion of the outer coupling member, one of double row inner peripheral side raceway surfaces of the bearing assembly being formed on the hub axle while the other of the inner peripheral side raceway surfaces is formed on the outer coupling member; an outer member having double row outer peripheral side raceway surfaces formed therein; rolling elements interposed between the raceway surfaces that radially confront to each other; hardened indentations formed in an inner periphery of the hub axle, the hub axle and the outer coupling member being plastically coupled integrally with each other by radially outwardly expanding a mounting area, at which the hub axle is mounted on the hollow stem portion of the outer coupling member, to allow the hollow stem portion to bite into the indentations to crimp; and detecting device provided in the outer member for detecting a displacement or deformation of the outer coupling member of the constant velocity universal joint and a displacement or deformation of the hub axle.

When a load acts on the drive wheel support bearing assembly during the travel of an automotive vehicle, the inner member, which is a rotational member, mainly undergoes deformation. The deformation of the inner member occurs in the outer coupling member and the hub axle. The displacement caused by the deformation of the outer coupling member or the deformation itself is detected by the detecting device provided in the outer member. The displacement caused by the deformation of the hub axle or the deformation itself is also detected by the detecting device provided in the outer member. Since the detecting device is provided in the drive wheel support bearing assembly this way, unlike the case in which the detecting device is provided on the side of a vehicle body structure, the displacement can be detected with nothing intervening and, therefore, the response of the vehicle attitude control system relative to a change in status of the road surface can be increased.

Also, since the site at which the displacement or deformation is detected by the detecting device is placed in the outer coupling member and the hub axle, both forming the inner member, displacement or deformation at a plurality of separated sites of the inner member can be detected and, therefore, detailed information on the deformation of the inner member can be acquired and the accurate vehicle attitude control can be achieved with the use of such information.

In the present invention, the detecting device of the outer coupling member of the constant velocity universal joint is preferably a sensor for detecting the displacement or deformation of an outer diametric portion thereof. The displacement or deformation of the outer diametric portion can be easily detected with a simple sensor.

The detecting device referred to above is preferably a gap sensor for detecting a distance to a detecting site which is an object to be detected. With this gap sensor, the distance or the like between the gap sensor and the detecting site distant therefrom can be detected. Therefore, while the sensor is provided in the outer member, the displacement or deformation of the outer coupling member and the hub axle, both forming the inner member, can be detected.

The drive wheel support bearing assembly may include a relative position measuring device as a detecting device, which is provided in the outer member for measuring a relative distance between the axial position of the outer coupling member of the constant velocity universal joint and the axial position of the hub axle.

When a load acts on the drive wheel support bearing assembly during the travel of an automotive vehicle, the inner member, which is a rotational member, mainly undergoes deformation. Although the deformation of the inner member occurs in the outer coupling member and the hub axle, the extent of such deformation is different between the outer coupling member and the hub axle. Accordingly, the relative axial position between the outer coupling member and the hub axle is measured by the relative position measuring device provided in the outer member and, based on a result of such measurement, the vehicle attitude control can be carried out.

The relative position measuring device referred to above may include a first sensor provided in the outer member so as to confront a marking formed on an outer diametric surface of the outer coupling member for detecting the marking opposed to the first sensor, a second sensor provided in the outer member so as to confront a marking formed in the hub axle for detecting the marking opposed to the second sensor, and comparing unit for comparing respective outputs of the first and second sensors with each other.

Since the deformation of the outer member is small even when the load acts on the drive wheel support bearing assembly, the provision of the first and second sensors in the outer member is effective to lessen the possibility that those sensors may be affected by the deformation of the bearing assembly and, hence, the markings provided in the outer diametric surface of the outer coupling member and the hub axle can be detected with high accuracy. When the respective outputs of the first and second sensor so detected with high accuracy are compared, the relative axial position between the outer coupling member of the constant velocity universal joint and the hub axle can be determined accurately.

Each of the makings referred to above may be of a kind having a magnetic, optical or morphological difference relative to surroundings, or each of the sensors referred to above may be in the form of a magnetic sensor or an optical sensor.

When arrangement is made that the makings having such a magnetic, optical or morphological difference relative to surroundings can be detected by the first and second sensors, which are in the form of a magnetic sensor or an optical sensor, the respective positions of the outer diametric portion of the outer coupling member and the hub axle, both forming the inner member, in the direction of rotation can be detected while the first and second sensors are provided in the outer member.

Use is preferably made of a bearing applied force measuring unit for measuring a force acting on the bearing unit by means of an output of one or both of the detecting device on the outer coupling member and the detecting device on the hub axle, and a coupling internal stress estimating unit for estimating an internal stress of the outer coupling member of the constant velocity universal joint or an hub axle internal stress estimating unit for estimating an inner stress of the hub axle.

Since the sensors are arranged in the bearing unit itself, the displacement or deformation of the hub axle and the outer diametric portion of the outer coupling member can be accurately detected with high response. For this reason, if the relationship between the displacement or deformation and the force acting on the bearing unit, the internal stress of the outer coupling member of the constant velocity universal joint and the internal stress of the hub axle are determined by means of a series of experiments or simulations, values of the characteristics to be inspected referred to above can be detected. Those characteristics so detected can be utilized in the vehicle control of the automotive vehicle.

Use may also be made of a fastened condition estimating unit for detecting a fastened condition of the diametrically expanded and crimped portion between the hub axle and the outer coupling member by means of an output of one or both of the detecting device on the outer coupling member and the detecting device on the hub axle.

The relationship between the displacement or deformation of the outer diametric portion of the outer coupling member and the hub axle and the crimped condition of the diametrically expanded and crimped portion can also be determined by means of a series of experiments or simulations. The fastened condition estimating unit makes use of this relationship so determined to estimate the fastened condition, for example, the degree of loosening of the diametrically expanded and crimped portion.

Since the use of the fastened condition estimating unit is effective to allow the fastened condition between the hub axle and the outer coupling member to be monitored at all times, any possible loosening or displacement in position between the hub axle and the outer coupling member of the constant velocity universal joint can readily be discovered and, therefore, it is possible to prevent abnormal sounds and/or vibrations from being generated due to premature separation or reduction of the rigidity of the bearing unit brought about by a release of the preload and also to prevent the ride quality and/or the traveling stability from getting worse.

Also, use may be made of a warning generating unit for comparing an output from any one of the detecting device referred to above, a result of measurement or a result of estimation with a preset range and for outputting an alarm in the event of the output from any one of the detecting device referred to above, the result of measurement or the result of estimation deviating from the preset range.

The provision of the warning generating unit is effective in that in the event that the output from any one of the detecting device referred to above, the result of measurement or the result of estimation deviates from the preset range, the driver or the like can be informed of such effect.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 9 is a diagram showing a longitudinal sectional view of a drive wheel support bearing assembly according to a third preferred embodiment of the present invention, shown together with a block diagram of a control system;

DESCRIPTION OF THE PREFFED EMBODIMENTS

Figure 1:
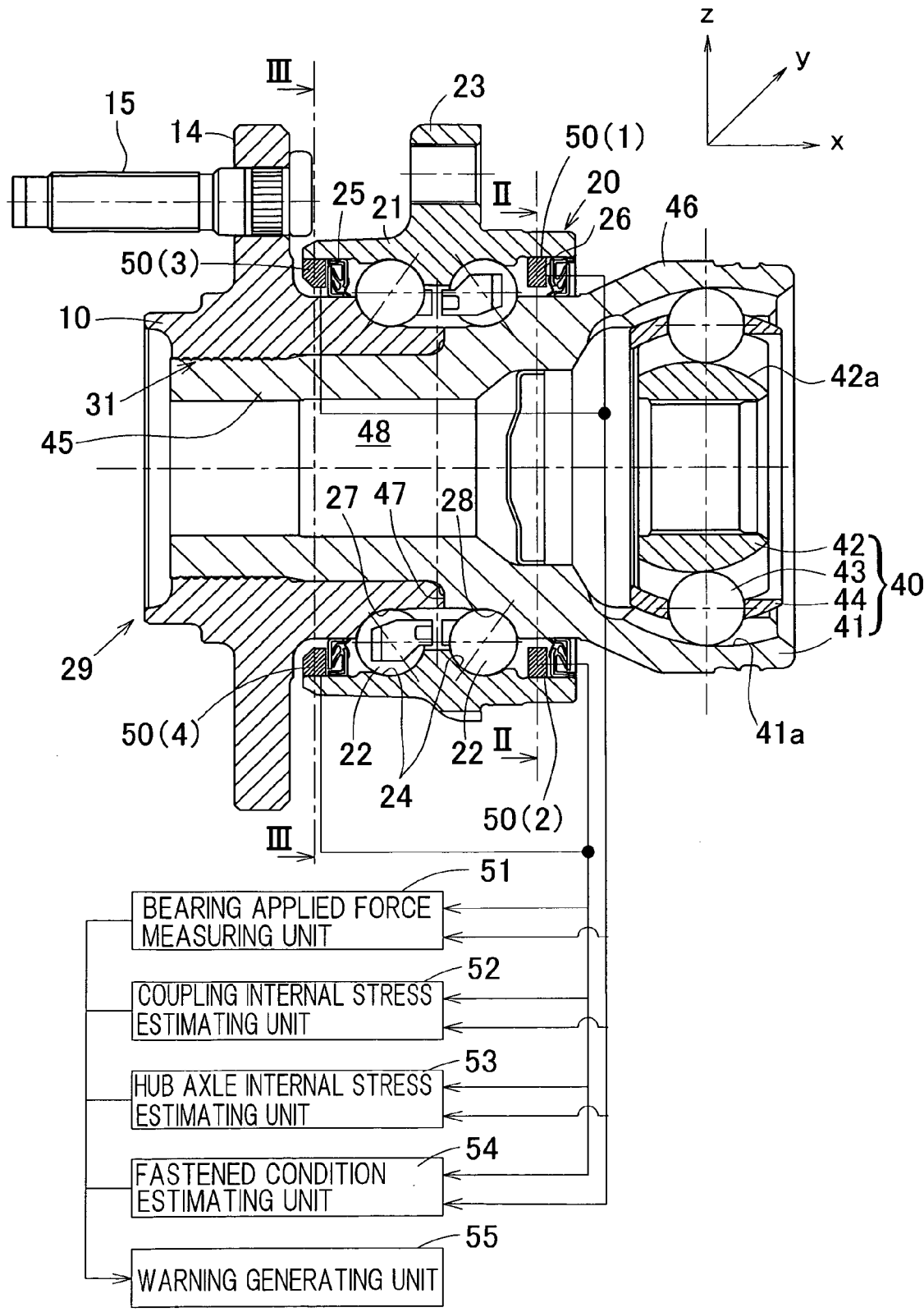
FIG. 1 is a diagram showing a longitudinal sectional view of a drive wheel support bearing assembly according to a first preferred embodiment of the present invention, shown together with a block diagram of a control system.

A first preferred embodiment of the present invention will be described with reference to FIGS. 1 to 3. This drive wheel support bearing assembly is a drive wheel support bearing assembly of a fourth generation type and includes a hub axle 10, a constant velocity universal joint 40 and a bearing unit 20, all unitized together. It is to be noted that in the following description, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

The hub axle 10 has an outboard end formed with a flange 14, to which a vehicle wheel (not shown) is fitted, and provided with a plurality of hub bolts 15 spaced an equal distance from each other in a direction circumferentially of the flange 14, and a wheel disc is secured to those hub bolts 15. A portion of the hub axle 10 on an inboard side of the flange 14 has an outer peripheral surface formed with an outboard raceway surface 27 of double row inner peripheral side raceway surfaces of the bearing unit 20. The hub axle 10 is in the form of a hollow axle having a throughhole defined therein so as to extend axially in alignment with the longitudinal axis thereof.

The constant velocity universal joint 40 is operable to transmit the torque from a drive shaft to an outer coupling member 41 through an inner coupling member 42 and a row of torque transmitting balls 43. The outer coupling member 41 has an inner peripheral portion formed with a plurality of track grooves 41a. Those track grooves 41a cooperate with respective track grooves 42a defined in an outer peripheral portion of the inner coupling member 42 to define corresponding ball tracks, in which the torque transmitting balls 43 are nested to thereby complete the constant velocity universal joint 40. The torque transmitting balls 43 are retained in the same plane by a retainer 44.

The outer coupling member 41 is made up of a stem portion 45 and a mouth portion 46, with the stem portion 45 inserted into the hub axle 10. A portion of the outer peripheral surface of the mouth portion 46 adjacent a shoulder 47 is formed with an inboard raceway surface 28 of double row inner peripheral side raceway surfaces of the bearing unit 20. The shoulder 47 of the mouth portion 46 is held in contact with an inboard end face of the hub axle 10 and, consequently, the hub axle 10 and the outer coupling member 41 are positioned relative to each other in the axial direction, and also the distance between the raceway surfaces 27 and 28 is fixed. The stem portion 45 is rendered to be hollow by defining therein the axially extending throughhole 48 that is communicated with the bottom of the bowl shaped mouth portion 46.

The stem portion 45 of the outer coupling member 41 is fastened to the hub axle 10 by means of a diametrical expansion and crimping technique. The diametrical expansion and crimping technique employed in the practice of this embodiment is carried out by forming in advance indentations 31 in a portion of the inner peripheral surface of the hub axle 10, for example, an outboard end thereof, performing a heat treatment to harden the indentations 31, inserting the stem portion 45 of the outer coupling member 41 into the inner periphery of the hub axle 10 so formed with the indentations 31 on the inner peripheral surface thereof, and expanding the stem portion 45 from an inner diametric side towards an outer diametric side by the use of a crimping tool to allow an outer periphery of the stem portion 45 to bite into the indentations 31 to thereby fasten the hub axle 10 and the outer coupling member 41 together. A portion of the inner peripheral surface of the hub axle 10 other than the indentations 31 is formed into a cylindrical shape that tightly fit to the cylindrical outer peripheral surface of the stem portion 45.

The indentations 31 referred to above has an indented shape which can be chosen arbitrarily and may be, for example, a screw shape, a serrated shape (including a splined shape), or a knurled shape represented by parallel grooves or a plurality of rows of grooves that are crossed. Of those shapes, the knurled shape is particularly effective to avoid a fretting (particularly that in an axial direction and a circumferential direction) after the crimping.

The bearing unit 20 includes an inner member 29 made up of the hub axle 10 and the outer coupling member 41, an outer member 21 and double row rolling elements 22. The outer member 21 is provided with a flange 23 for connecting with a vehicle body structure (not shown) and has an inner peripheral surface formed with double row outer peripheral side raceway surfaces 24 which are opposed to an inner peripheral side raceway surface 27 of the hub axle 10 and an inner peripheral side raceway surface 28 of the outer coupling member 41. The double row rolling elements 22 are incorporated between the inner peripheral side raceway surfaces 27 and 28 and the outer peripheral side raceway surface 24. Although in the instance now under discussion, the double row angular contact ball bearing utilizing the rolling elements 22 in the form of a ball is illustrated, it may occur that a double row tapered roller bearing of a type utilizing tapered roller as the rolling elements is employed in the case of a drive wheel support bearing assembly for use in an automotive vehicle having a substantial weight. Opposite open ends of the outer member 21 are provided with sealing members 25 and 26 for sealing between the outer member 21 and the hub axle 10 and between the outer member 21 and the outer coupling member 41 so as to avoid any leakage of a grease filled within the bearing unit and as well as to avoid an ingress of water and/or foreign matter from the outside.

Figure 2:
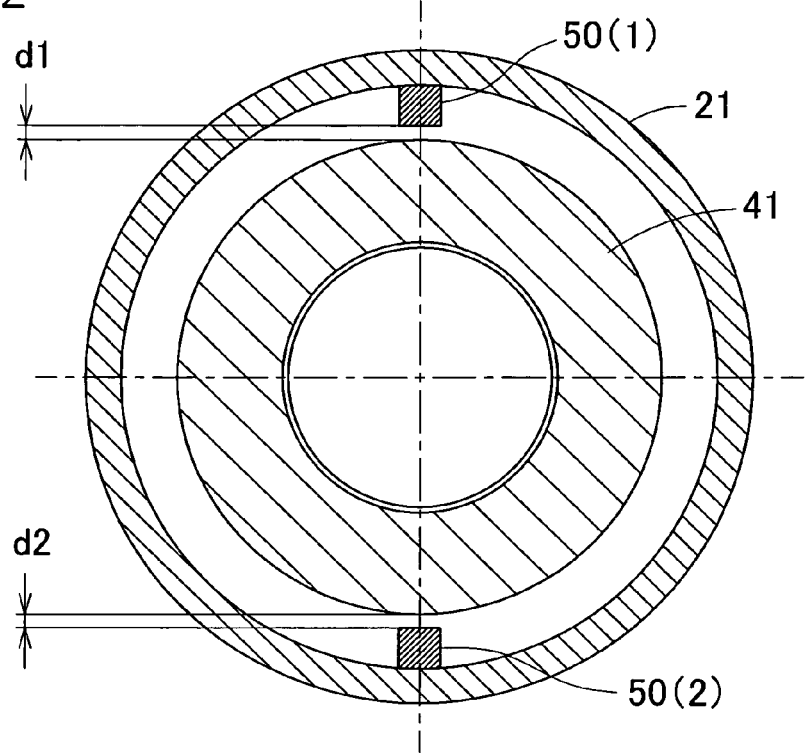
FIG. 2 is a cross-sectional view taken along the line II-II in FIG. 1.

Sensors 50(1) and 50(2) for detecting a displacement or deformation of an outer diametric portion of the outer coupling member 41 are provided in the inner peripheral surface of the outer member 21 between the inboard rolling elements 22 and the inboard sealing member 26, and are spaced 180° in phase from each other as shown in FIG. 2. The sensors 50(1) and 50(2) are in the form of a sensor of a gap type and are operable to detect the respective distances (the respective detection amounts d1 and d2) in the radial direction from the sensors 50(1) and 50(2) to the outer diametric portion of the outer coupling member 41 that is opposed thereto.

Figure 3:
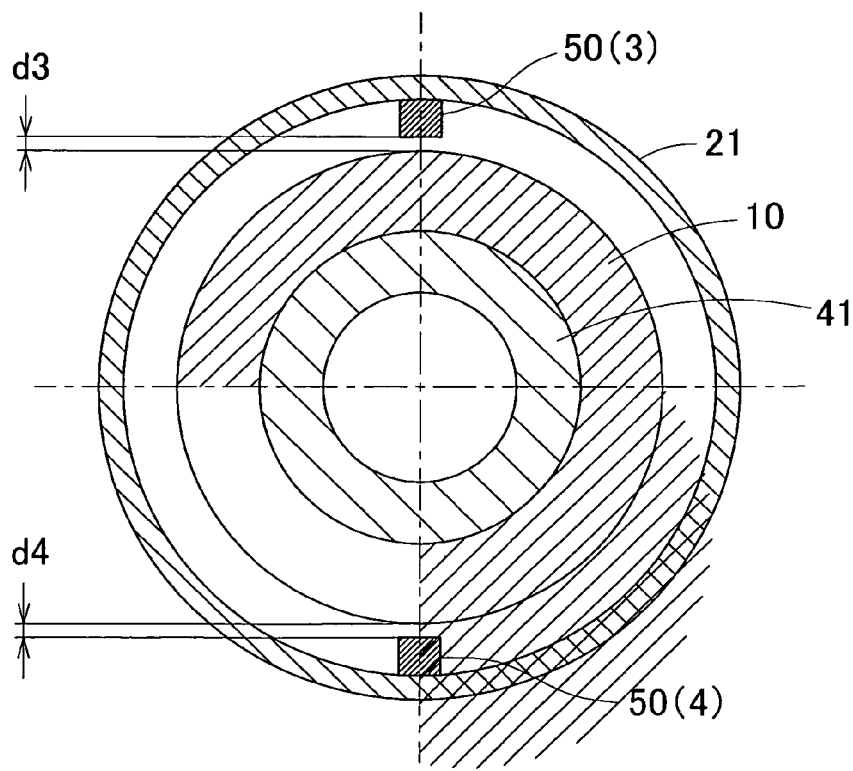
FIG. 3 is a cross-sectional view taken along the line III-III in FIG. 1.

Sensors 50(3) and 50(4) for detecting a displacement or deformation of the hub axle 10 is provided in the inner peripheral surface of the outer member 21 at a position on a further outboard side of the outboard sealing member 25, and spaced 180° in phase from each other as shown in FIG. 3. Those sensors 50(3) and 50(4) are in the form of a sensor of a gap type and are operable to detect the respective distances (the respective detection amounts d3 and d4) in the axial direction from the sensors 50(3) and 50(4) to a cylindrical body portion of the hub axle 10 that is opposed thereto. The positions, at which the sensors 50(1) and 50(2) for detecting the deformation of the outer coupling member 41 are fitted, and the position, at which the sensors 50(3) and 50(4) for detecting the deformation of the hub axle are fitted, are the same in phase about the axis of rotation.

Figure 4:
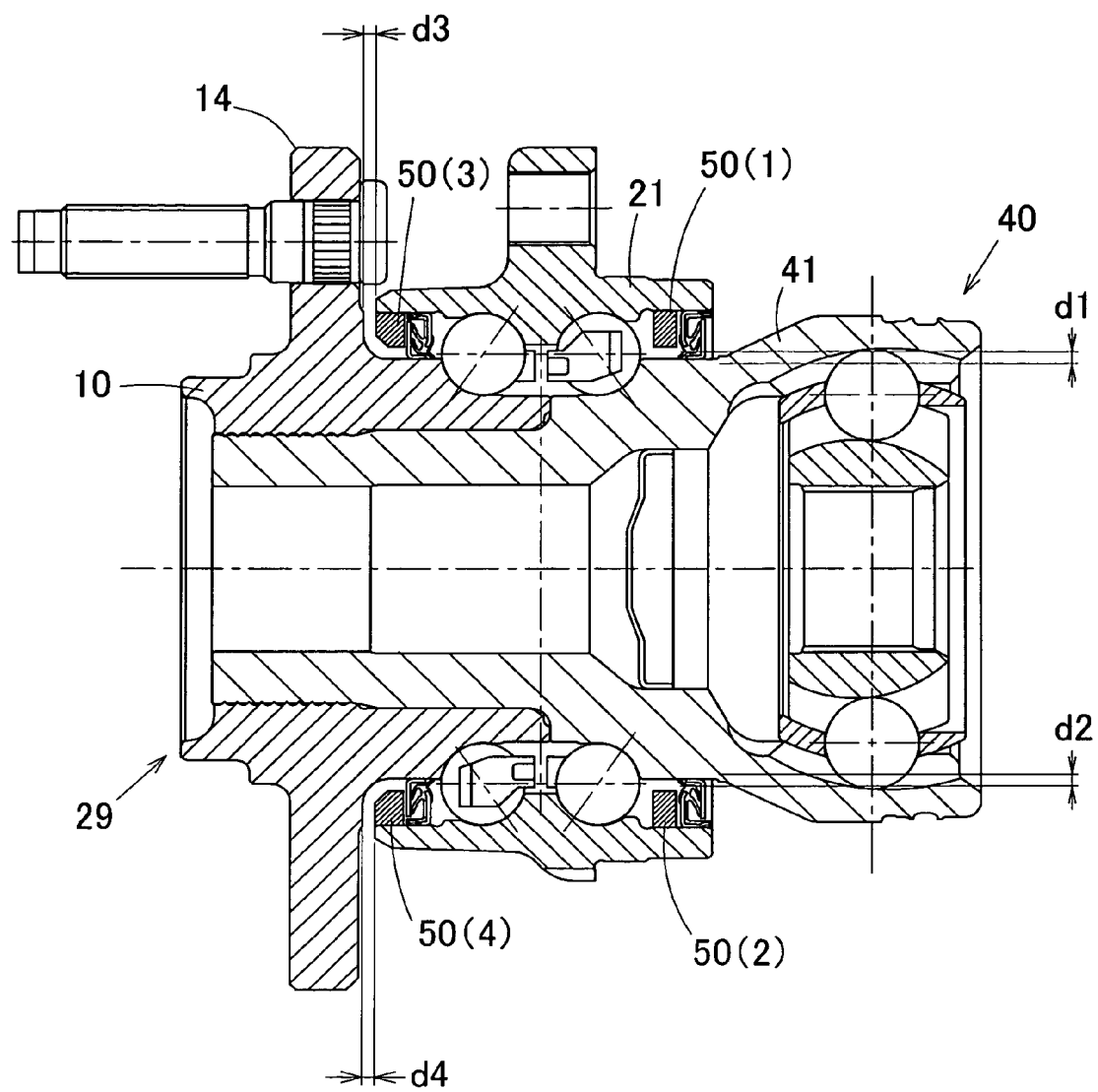
FIG. 4 is a sectional view of the drive wheel support bearing assembly according to another preferred embodiment of the present invention.

As shown in FIG. 4, by the sensors 50(3) and 50(4), the respective distances (the respective detection amounts d3 and d4) in the axial direction from the sensors 50(3), 50(4) to the flange 14 of the hub axle 10 may be detected.

The sensors 50(1) to 50(4) are connected with a bearing applied force measuring unit 51, a coupling internal stress estimating unit 52, a hub axle internal stress estimating unit 53, a fastened condition estimating unit 54 and a warning generating unit 55, respectively. Respective functions of those units 51, 52, 53, 54 and 55 will be described later.

The operation of the drive wheel support bearing assembly of the construction described above will now be described. When a load acts on the drive wheel support bearing assembly during the travel of an automotive vehicle, mainly the hub axle 10 and the outer coupling member 41 of the inner member 29, which are rotational members, undergo deformation. The deformation of the outer coupling member 41 is detected by the sensors 50(1) and 50(2) and the deformation of the hub axle 10 is detected by the sensors 50(3) and 50(4).

The direction and magnitude of displacement of the outer diametric portion of the outer coupling member 41 and the hub axle 40 vary depending on the direction and magnitude of the load. If the relationship between the displacement and the load is determined by means of a series of experiments or simulations, the force acting on the bearing unit, the internal stress occurring in the outer coupling member 41 of the constant velocity universal joint 40 and the internal stress occurring in the hub axle 10 can be calculated or estimated. The bearing applied force measuring unit 51 calculates the force acting on the bearing unit from respective outputs of the sensors 50(1) to 50(4) in reference to the relation between the load and displacement, which has been determined by means of the experiments or simulations. Also, the coupling internal stress estimating unit 52 and the hub axle internal stress estimating unit 53 estimate, respectively, the internal stress, occurring in the outer coupling member 41 of the constant velocity universal joint 40, and the internal stress occurring in the hub axle 10 from the outputs of the sensors 50(1) to 50(4) in reference to the relation between the load and the displacement, which has been determined by the experiments or simulations.

Also, the fastened condition estimating unit 54 is operable to make a comprehensive assessment of respective results of measurement performed by the bearing applied force measuring unit 51, the coupling internal stress estimating unit 52 and the hub axle internal stress estimating unit 53 according to predetermined rules to thereby estimate a fastened condition between the hub axle 10 and the outer coupling member 41.

In the event that the detection amounts d1 to d4 of the sensors 50(1) to 50(4), the result of measurement by the bearing applied force measuring unit 51 and the results of estimate by the estimating units 52, 53 and 54, when compared with predetermined values, are out of a predetermined range, a warning is issued from the warning generating unit 55.

As hereinabove described, in this drive wheel support bearing assembly according to the first embodiment, based on the results of detection performed by the sensors 50(1) to 50(4), various pieces of information associated with the vehicle attitude control can be obtained from the bearing applied force measuring unit 51, the coupling internal stress estimating unit 52, the hub axle internal stress estimating unit 53, the fastened condition estimating unit 54 and the warning generating unit 55. Accordingly, the response of the vehicle attitude control system relative to the change in status of the road surface can be increased, and also, the presence or absence of the abnormality in the bearing assembly itself can be diagnosed, and, thus, the vehicle attitude control can be performed accurately and safely.

Also, since the hub axle 10 and the outer diametric portion of the outer coupling member 41 of the constant velocity universal joint 40 are chosen to be the detecting sites at which the displacement or deformation of the inner member 29 can be detected by the sensors 50(1) to 50(4), it is possible to secure detailed information concerning the deformation of the inner member 29 by detecting the deformation or displacement of a plurality of sites of the inner member 29 that are separated from each other and, for this reason, the accuracy of the vehicle attitude control can be increased.

Figure 5:
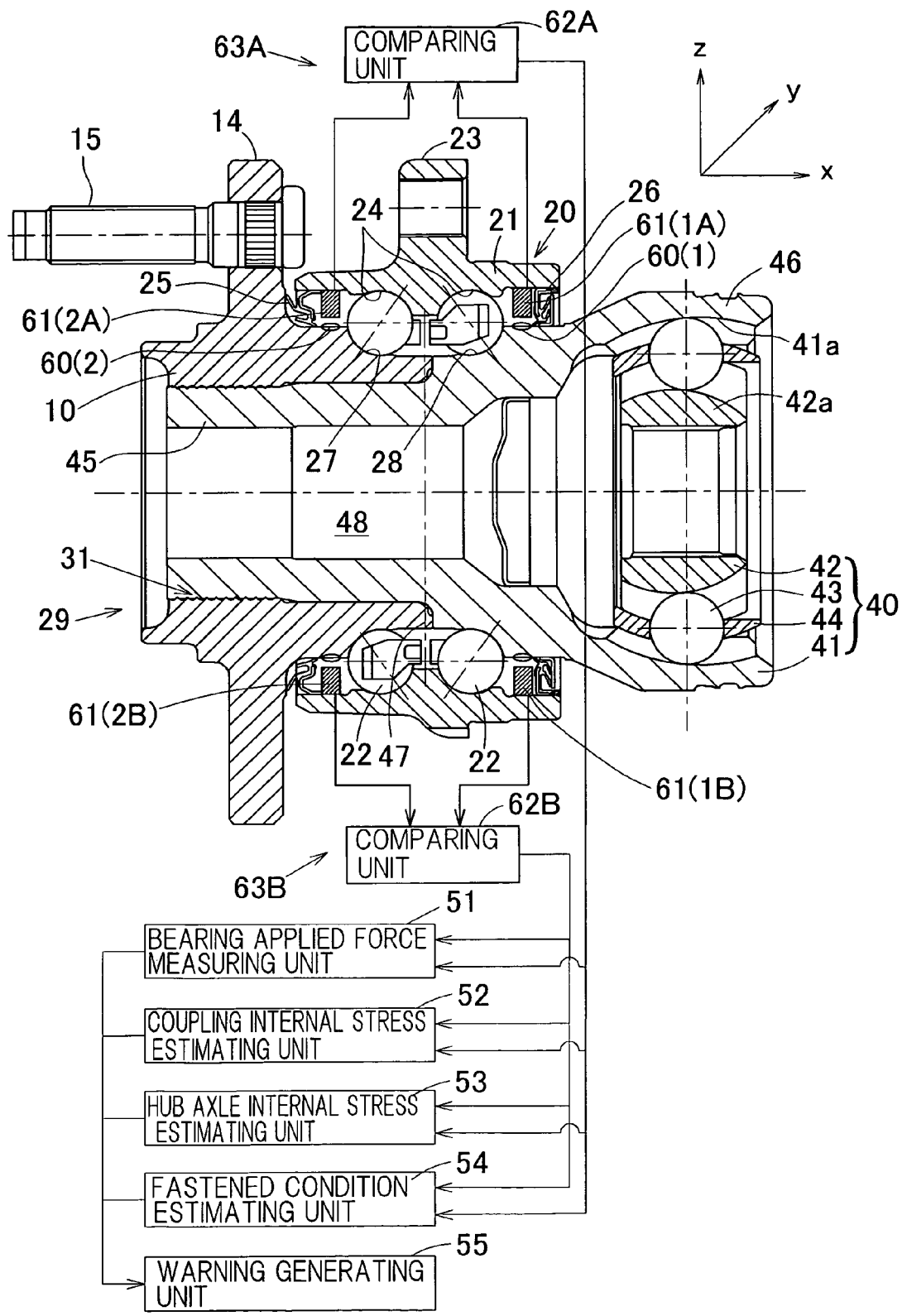
FIG. 5 is a diagram showing a longitudinal sectional view of a drive wheel support bearing assembly according to a second preferred embodiment of the present invention, shown together with a block diagram of a control system.

A second preferred embodiment of the present invention will be described with particular reference to FIG. 5. This embodiment differs from the first embodiment (FIG. 1) in respect of the use of the detecting device, which is in this embodiment employed in the form of a relative position measuring device 63 for measuring a relative axial position between the outer coupling member 41 of the constant velocity universal joint 40 the hub axle 10. Component parts of the second embodiment, but similar to those in the first embodiment are designated by like reference numerals used in describing the first embodiment.

A portion of the inner peripheral surface of the outer member 21 between the inboard rolling elements 22 and the inboard sealing member 26 is provided with first sensors 61(1A) and 61(1B) for detecting an annular marking 60(1) provided on an outer diametric surface of the outer coupling member 41 and, similarly, a portion of the inner peripheral surface of the outer member 21 between the outboard rolling elements 22 and the outboard sealing member 25 is provided with second sensors 61(2A) and 61(2B) for detecting an annular marking 60(2) provided on the hub axle 10.

The first sensor 61(1A) and the second sensor 61(2A) are arranged on the same phase about the axis of rotation of the bearing assembly and the relative position between the position of the outer coupling member 41 of the constant velocity universal joint 40 about the direction of rotational axis (x-axis direction) and the position of the hub axle 10 in the direction of rotational axis is measured by comparing respective outputs of those sensors by means of a comparing unit 62A. The first sensor 61(1A), the second sensor 61(2A) and the comparing unit 62A altogether constitute the relative position measuring system 63A.

Similarly, the first sensor 61(1B) and the second sensor 61(2B) are arranged on the same phase about the axis of rotation of the bearing assembly and the relative position between the position of the outer coupling member 41 of the constant velocity universal joint 40 about the direction of rotational axis and the position of the hub axle 10 in the direction of rotational axis is measured by comparing respective outputs of those sensors by means of a comparing unit 62B. The first sensor 61(1B), the second sensor 61(2B) and the comparing unit 62B altogether constitute the relative position measuring system 63B. The sensors 61(1A) and 61(2A) and the sensors 61(1B) and 61(2B) are provided at respective phases, for example, at 1800 spaced phases about the axis of rotation of the bearing assembly.

Figure 6:
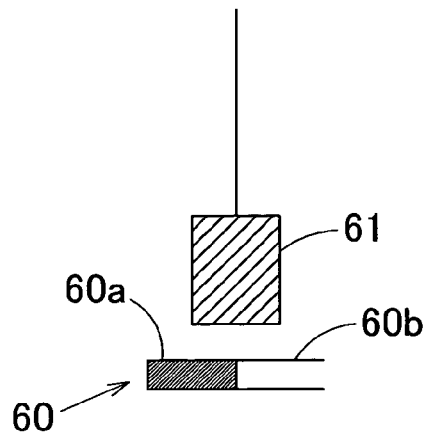
FIG. 6 is an enlarged diagram showing a sensor and a sealing member.

In the case of this embodiment, each of the sensors 61(1A, 1B, 2A, 2B) is an optical sensor and the marking 60(1, 2) opposed thereto is rendered to be a target surface colored in, for example, a black portion 60a and a white portion 60b as shown in FIG. 6. In other words, the marking 60(1, 2) is of a type having an optical difference relative to the surrounding. The sensor 61(1A, 1B, 2A, 2B), when detecting the position of the boundary between the black portion 60a and the white portion 60b of the target surface, detects the position of the outer coupling member 41 in the axial direction of rotation or the position of the hub axle 10 in the axial direction.

The comparing units 62A and 62B are connected with the bearing applied force measuring unit 51, the coupling internal stress estimating unit 52, the hub axle internal stress estimating unit 53, the fastened condition estimating unit 54 and the warning generating unit 55. The respective functions of those units 51, 52, 53, 54 and 55 will be described later.

The operation of the drive wheel support bearing assembly will now be described. When a load acts on the drive wheel support bearing assembly during the travel of an automotive vehicle, mainly the inner member 29, which is a rotational member, undergoes deformation. The deformation of the inner member 29 varies between the outer coupling member 41 and the hub axle 10 and also varies depending on the circumferential position about the axis of rotation. In view of this, detailed information on the bearing assembly can be obtained when a plurality of positions of the outer coupling member 41 and the hub axle 10 in the direction of rotation are individually detected.

Figure 7:
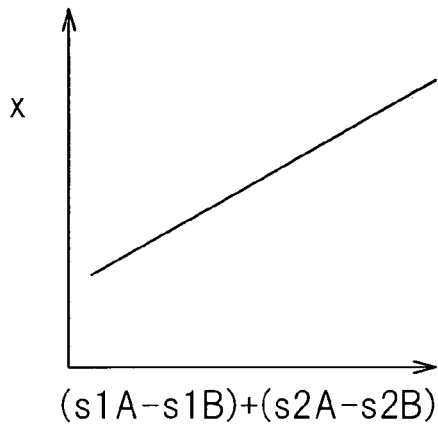
FIG. 7 is a chart showing the relation between a sensor output and a relative displacement of an outer coupling member and a hub axle in an x-axis direction.
Figure 8:
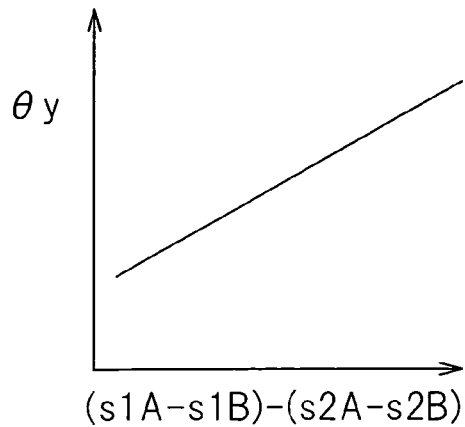
FIG. 8 is a chart showing the relation between the sensor output and strains about a Y-axis of the outer coupling member and the hub axle.
Figure 10A:
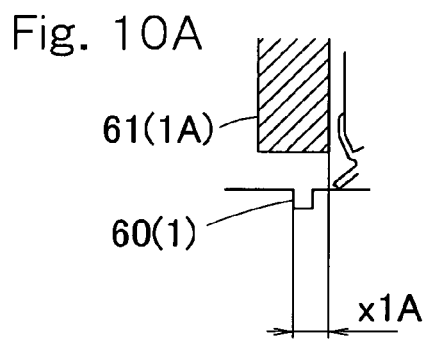
FIG. 10A is an enlarged diagram showing a first sensor and a marking shown in an upper portion of FIG. 9.
Figure 10B:
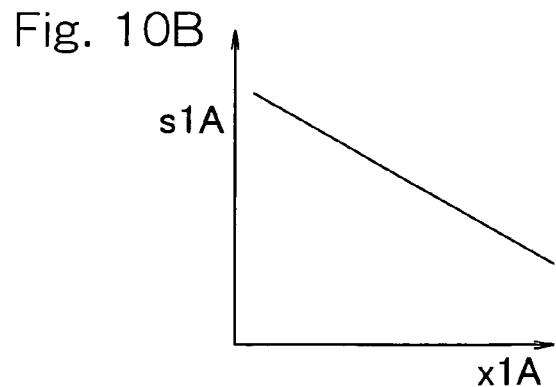
FIG. 10B is a chart showing the relationship between the position of the sensor in the x-axis direction and an output of such sensor.
Figure 11A:
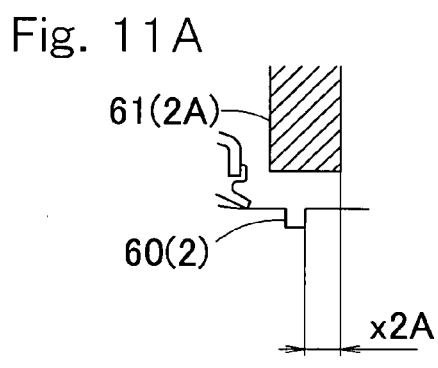
FIG. 11A is an enlarged diagram showing a second sensor and a marking shown in the upper portion of FIG. 9.
Figure 11B:
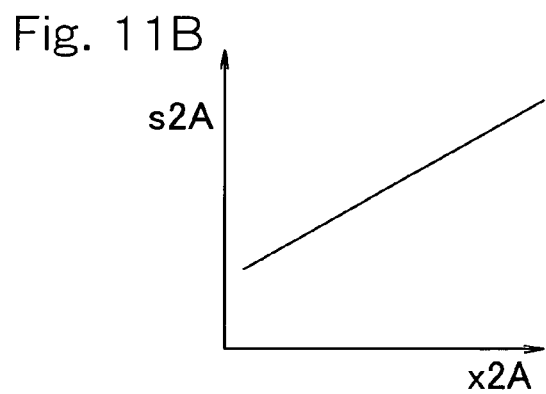
FIG. 11B is a chart showing the relationship between the position of the sensor in the x-axis direction and an output of such sensor.
Figure 12A:
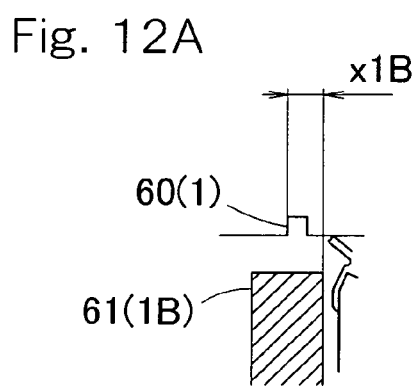
FIG. 12A is an enlarged diagram showing a first sensor and a marking shown in a lower portion of FIG. 9.
Figure 12B:
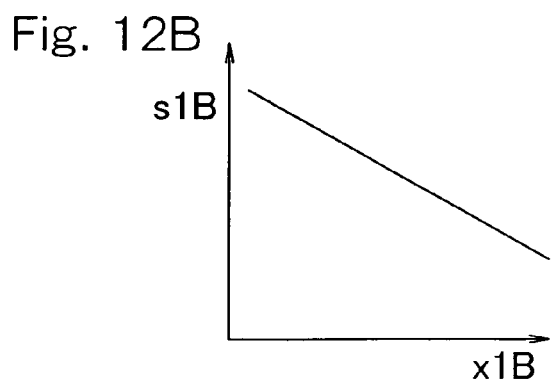
FIG. 12B is a chart showing the relationship between the position of the sensor in the x-axis direction and an output of such sensor.
Figure 13A:
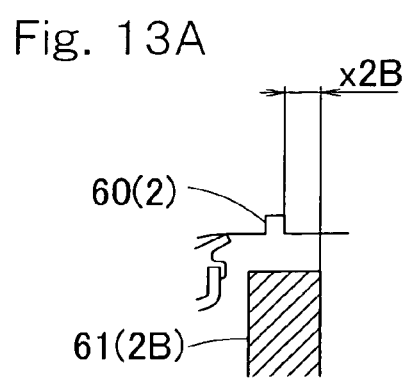
FIG. 13A is an enlarged diagram showing a second sensor and a marking shown in the lower portion of FIG. 9.
Figure 13B:
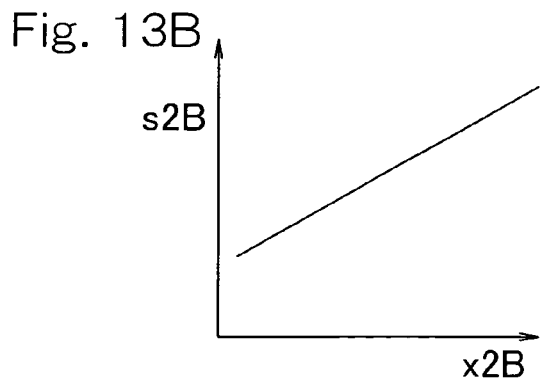
FIG. 13B is a chart showing the relationship between the position of the sensor in the x-axis direction and an output of such sensor.

More specifically, assuming that the outputs of the sensors 61(1A), 61(1B), 61(2A) and 61(2B) are represented by s1A, s1B, s2A and s2B, respectively, the relation between (s1A-s1B)+(s2A-s2B) and the relative axial displacement x between the respective positions (in the x-axis direction) of the outer coupling member 41 and the hub axle 10 can be expressed as shown in FIG. 7, and the relation between (s1A-s1B)−(s2A-s2B) and the strain θy of the outer coupling member 41 and the hub axle 10 about the y-axis is expressed as shown in FIG. 8. The y-axis is in the horizontal direction perpendicular to the x-axis and represents a forward and rearward direction of the automotive vehicle on which this bearing assembly is mounted. Here, (s1A-s1B) and (s2A-s2B) represent the relative positions between the position of the outer coupling member 41 in the axial direction and the position of the hub axle 10 in the axial direction, respectively, and can be determined by the comparing units 62A and 62B. Based on the relations shown respectively in FIGS. 7 and 8, from the respective outputs of the sensors, the relative displacement x between the outer coupling member 41 and the hub axle 10 in the x-axis direction and the strain θy between the outer coupling member 41 and the hub axle 10 about the y-axis can be determined.

If the relation between the values x and θy so determined and the following items are determined beforehand by means of a series of experiments and simulations, the force acting on the bearing unit, the internal stress occurring in the outer coupling member 41 of the constant velocity universal joint 40 and the internal stress occurring in the hub axle 10 can be calculated or estimated. The bearing applied force measuring unit 51 calculates the force acting on the bearing unit from respective outputs of the sensors 60(1A, 1B, 2A, 2B) in reference to the relation, which has been determined by means of the experiments or simulations. Also, the coupling internal stress estimating unit 52 and the hub axle internal stress estimating unit 53 estimate, respectively, the internal stress, occurring in the outer coupling member 41 of the constant velocity universal joint 40, and the internal stress occurring in the hub axle 10 from the outputs of the sensors 60(1A, 1B, 2A, 2B) in reference to the relation, which has been determined by the experiments or simulations.

Also, the fastened condition estimating unit 54 is operable to make a comprehensive assessment of respective results of measurement performed by the bearing applied force measuring unit 51, the coupling internal stress estimating unit 52 and the hub axle internal stress estimating unit 53 according to predetermined rules to thereby estimate a fastened condition of the hub axle 10 and the outer coupling member 41.

In the event that the outputs of the sensors 61(1A, 1B, 2A, 2B), the result of measurement by the bearing applied force measuring unit 51 and the results of estimate by the estimating units 52, 53 and 54, when compared with predetermined values, are out of a predetermined range, a warning is issued from the warning generating unit 55.

As hereinabove described, in this drive wheel support bearing assembly according to this embodiment, based on the results of detection performed by the sensors 61(1A, 1B, 2A, 2B), various pieces of information on the bearing assembly, which are associated with the vehicle attitude control, can be obtained from the bearing applied force measuring unit 51, the coupling internal stress estimating unit 52, the hub axle internal stress estimating unit 53, the fastened condition estimating unit 54 and the warning generating unit 55. Accordingly, the response of the vehicle attitude control system relative to the change in status of the road surface can be increased and also, the presence or absence of the abnormality in the bearing assembly itself can be diagnosed, and hence, the vehicle attitude control can be performed accurately and safely.

Also, since the optical sensor is employed for each of the sensors 61(1A, 1B, 2A, 2B), it is possible to enable the sensors, which are fitted to the outer member 21 that is less susceptible to deformation, to detect the respective positions of the outer coupling member 41 and the hub axle 10 in the axial direction, resulting in an increase of the detecting accuracy.

FIG. 9 illustrates a third preferred embodiment of the present invention. The difference between this embodiment and the second embodiment (FIG. 5) lies in that for each of the sensors 61(1A), 61(1B), 61(2A) and 61(2B), a magnetic sensor is employed and the marking 60(1) and 60(2) opposed thereto is employed in the form of a groove shaped circumferential cutout formed in the outer peripheral surface of each of the outer coupling member 41 and the hub axle 10 as shown in FIGS. 10A, 11A, 12A and 13A. The relations between the positions x1A, x1B, x2A, x2B of the markings 60(1) and 60(2) in the direction of rotation and the respective outputs s1A, s1B, s2A, s2B are shown in FIGS. 10B, 11B, 12B and 13B.

Even in the case of this embodiment, the comparing units 62A and 62B compare the outputs of the first sensor 61(1A) and 61(1B) with the outputs of the second sensors 61(2A) and 61(2B), respectively, to measure the relative positions of the outer coupling member 41 in the axial direction and the hub axle 10 in the axial direction. Then, based on the results of measurement, various pieces of information on the bearing assembly, which are associated with the vehicle attitude control, can be obtained from the bearing applied force measuring unit 51, the coupling internal stress estimating unit 52, the hub axle internal stress estimating unit 53, the fastened condition estimating unit 54 and the warning generating unit 55. Accordingly, in a manner similar to that described above, the response of the vehicle attitude control system relative to the change in status of the road surface can be increased and also, the presence or absence of the abnormality in the bearing assembly itself can be diagnosed, and, accordingly, the vehicle attitude control can be performed accurately and safely.

Even where a magnetic sensor is employed for each of the sensors 61(1A), 61(1B), 61(2A) and 61(2B), it is possible to enable the sensors, which are fitted to the outer member 21 that is less susceptible to deformation, to detect the respective positions of the outer coupling member 41 and the hub axle 10 in the axial direction, resulting in an increase of the detecting accuracy, in a manner similar to that where the optical sensors are employed.

Figure 14:
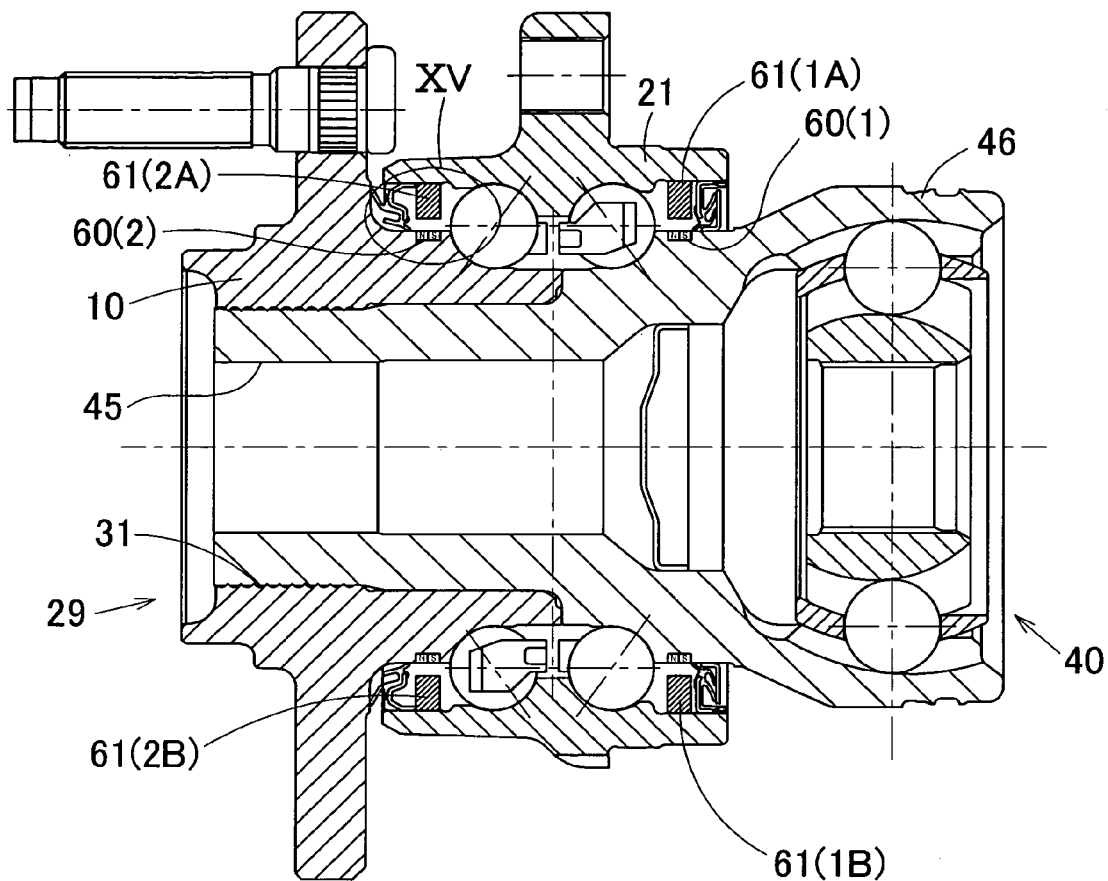
FIG. 14 is a longitudinal sectional view of the drive wheel support bearing assembly according to another preferred embodiment of the present invention.
Figure 15:
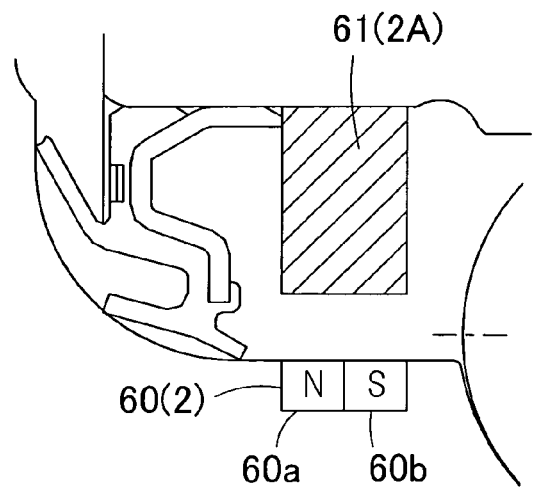
FIG. 15 is an enlarged diagram of a portion of FIG. 14 indicated by XV.
Figure 16:
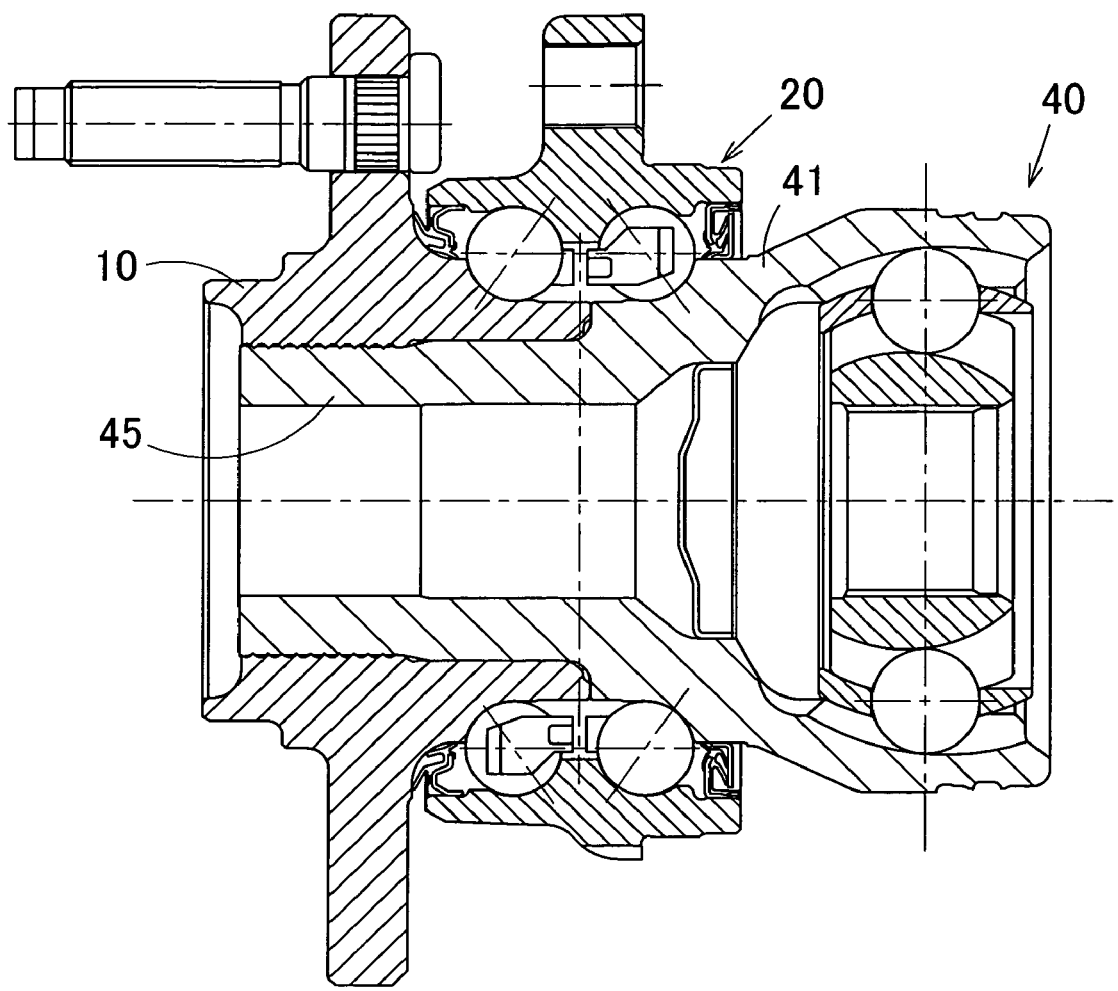
FIG. 16 is a longitudinal sectional view of the conventional drive wheel support bearing assembly.

As shown in FIGS. 14 and 15, where the magnetic sensor is employed for each of the sensors 61(1A), 61(1B), 61(2A) and 61(2B), the markings 60(1) and 60(2) provided in the target surface confronting thereto may be employed in the form of a magnetized patter comprised of an N pole 60a and an S pole 60b.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, any sensor different from those employed in any one of the foregoing embodiments can be employed for detecting the deformation.

Accordingly, such changes and modifications are, unless they depart from the scope of the present invention as delivered from the claims annexed hereto, to be construed as included therein.

What is claimed is:

1. A drive wheel support bearing assembly which comprises:
   a hub axle, a constant velocity universal joint and a bearing unit which are unitized together;
   an inner member including an outer coupling member of the constant velocity universal joint and the hub axle mounted on an outer periphery of a hollow stem portion of the outer coupling member, one of double row inner peripheral side raceway surfaces of the bearing assembly being formed on the hub axle while the other of the inner peripheral side raceway surfaces is formed on the outer coupling member;
   an outer member having double row outer peripheral side raceway surfaces formed therein;
   rolling elements interposed between the raceway surfaces that radially confront to each other;
   hardened indentations formed in an inner periphery of the hub axle, the hub axle and the outer coupling member being plastically coupled integrally with each other by radially outwardly expanding a mounting area, at which the hub axle is mounted on the hollow stem portion of the outer coupling member, to allow the hollow stem portion to bite into the indentations to crimp; and
   detecting device provided in the outer member for detecting a displacement or deformation of the outer coupling member of the constant velocity universal joint and a displacement or deformation of the hub axle.

2. The drive wheel support bearing assembly as claimed in claim 1, wherein the detecting device is, so long as the outer coupling member of the constant velocity universal joint is concerned, a sensor for detecting the displacement or deformation of an outer diametric portion thereof.

3. The drive wheel support bearing assembly as claimed in claim 1, wherein the detecting device is a gap sensor.

4. The drive wheel support bearing assembly as claimed in claim 1, wherein the detecting device is a relative position measuring device for measuring a relative distance between the axial position of the outer coupling member of the constant velocity universal joint and the axial position of the hub axle.

5. The drive wheel support bearing assembly as claimed in claim 4, wherein the relative position measuring device comprises a first sensor provided in the outer member so as to confront a marking formed on an outer diametric surface of the outer coupling member for detecting the marking opposed to the first sensor, a second sensor provided in the outer member so as to confront a marking formed in the hub axle for detecting the marking opposed to the second sensor, and comparing unit for comparing respective outputs of the first and second sensors with each other.

6. The drive wheel support bearing assembly as claimed in claim 5, wherein each of the marks has a magnetic, optical or morphological difference relative to a surrounding.

7. The drive wheel support bearing assembly as claimed in claim 5, wherein each of the sensors is a magnetic sensor or an optical sensor.

8. The drive wheel support bearing assembly as claimed in claim 1, further comprising a bearing applied force measuring unit for measuring a force acting on the bearing unit by means of an output of one or both of the detecting device on the outer coupling member and the detecting device on the hub axle.

9. The drive wheel support bearing assembly as claimed in claim 1, further comprising a coupling internal stress estimating unit for estimating an internal stress of the outer coupling member of the constant velocity universal joint by means of an output of one or both of the detecting device on a detecting side of the outer coupling member and the detecting device on a detecting side of the hub axle.

10. The drive wheel support bearing assembly as claimed in claim 1, further comprising a hub axle internal stress estimating unit for estimating an internal stress of the hub axle by means of an output of one or both of the detecting device on the outer coupling member and the detecting device on the hub axle.

11. The drive wheel support bearing assembly as claimed in claim 1, further comprising a fastened condition estimating unit for detecting a fastened condition of the diametrically expanded and crimped portion between the hub axle and the outer coupling member by means of an output of one or both of the detecting device on the outer coupling member and the detecting device on the hub axle.

12. The drive wheel support bearing assembly as claimed in claim 1, further comprising a warning generating unit for comparing an output from any one of the detecting device, a result of measurement or a result of estimation with a preset range and for outputting an alarm in the event of the output from any one of the detecting device, the result of measurement or the result of estimation deviating from the preset range.

* * * * *